United States Patent
Arai et al.

(10) Patent No.: US 7,600,806 B2
(45) Date of Patent: Oct. 13, 2009

(54) ATTACHMENT STRUCTURE AND ATTACHMENT METHOD FOR WINDOW GLASS AND GLASS MOLDING

(75) Inventors: Kiyoshi Arai, Utsunomiya (JP); Michio Tamura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/901,542

(22) Filed: Sep. 18, 2007

(65) Prior Publication Data

US 2008/0073939 A1    Mar. 27, 2008

(30) Foreign Application Priority Data

Sep. 27, 2006    (JP) .......................... P 2006-262042

(51) Int. Cl.
*B60J 1/10*    (2006.01)

(52) U.S. Cl. .................................... 296/146.15; 296/93

(58) Field of Classification Search ............ 296/146.15, 296/201, 93, 146.9, 96.21, 146.1
See application file for complete search history.

(56) References Cited

U.S. PATENT DOCUMENTS

| | | | | |
|---|---|---|---|---|
| 2,894,784 A * | 7/1959 | Howard | ..................... | 52/204.51 |
| 3,245,182 A * | 4/1966 | Zierold | ..................... | 296/96.21 |
| 3,751,785 A * | 8/1973 | Whitesell | ..................... | 29/267 |
| 4,135,277 A * | 1/1979 | Taniai et al. | ............. | 296/96.21 |
| 4,139,234 A * | 2/1979 | Morgan | ..................... | 296/201 |
| 4,139,971 A * | 2/1979 | Kimura | ..................... | 52/208 |
| 4,170,855 A * | 10/1979 | Murray et al. | ................. | 52/208 |
| 4,172,000 A * | 10/1979 | Horike et al. | ................. | 296/93 |
| 4,389,069 A * | 6/1983 | Sengoku | ..................... | 296/93 |
| 4,434,593 A | 3/1984 | Horike et al. | | |
| 4,531,335 A * | 7/1985 | Mangan | ..................... | 296/96.21 |
| 4,653,801 A * | 3/1987 | Shirasu et al. | ................. | 296/93 |
| 4,703,973 A | 11/1987 | Fujikawa | | |
| 4,719,736 A * | 1/1988 | Aho et al. | ..................... | 296/201 |
| 4,754,586 A * | 7/1988 | Fujikawa | ..................... | 52/208 |
| 4,768,319 A | 9/1988 | Derner | | |
| 4,861,540 A | 8/1989 | Nieboer et al. | | |
| 5,142,834 A * | 9/1992 | Laclave et al. | ................. | 52/208 |
| 5,154,471 A * | 10/1992 | Mimura et al. | ................. | 296/93 |
| 5,740,640 A * | 4/1998 | Yasuda | ................... | 296/146.16 |

(Continued)

FOREIGN PATENT DOCUMENTS

EP    0 268 815 A2    6/1988

(Continued)

*Primary Examiner*—Kiran B. Patel
(74) *Attorney, Agent, or Firm*—Carrier, Blackman & Associates, P.C.; William D. Blackman; Joseph P. Carrier

(57) ABSTRACT

An attachment structure for a window glass and a glass molding in which the window glass and the glass molding are attached to a glass fitting section of a vehicle body via a molding clip having a glass holding section and a molding attachment section, wherein: the glass holding section is engaged with a peripheral edge of the window glass such that relative movement between the window glass and the glass molding is possible only in a direction along the peripheral edge; the molding attachment section is attached to the glass molding; and the relative movement is restricted along an inside-outside direction of the vehicle body but is allowed in a direction along the surface of the window glass.

6 Claims, 7 Drawing Sheets

U.S. PATENT DOCUMENTS

| | | | | |
|---|---|---|---|---|
| 5,846,631 | A * | 12/1998 | Nowosiadly | 428/99 |
| 6,546,683 | B1 * | 4/2003 | Senge | 52/208 |
| 6,715,821 | B2 * | 4/2004 | Kanie et al. | 296/146.15 |
| 7,165,371 | B2 * | 1/2007 | Yoyasu | 52/716.5 |

FOREIGN PATENT DOCUMENTS

| | | |
|---|---|---|
| EP | 0 268 815 A3 | 6/1988 |
| FR | 2 577 483 | 8/1986 |
| FR | 2 847 518 | 5/2004 |
| GB | 2 397 844 A | 8/2004 |
| JP | S59-182416 | 12/1984 |
| JP | 60-033123 | 2/1985 |
| JP | 60-46325 | 4/1985 |
| JP | S63-65516 | 4/1988 |
| JP | S63-162625 | 10/1988 |
| JP | 03-042327 | 2/1991 |
| JP | H04-39107 | 4/1992 |
| JP | 04-303017 | 10/1992 |
| JP | 04-137910 | 12/1992 |
| JP | 08-058383 | 3/1996 |

* cited by examiner

ATTACHMENT STRUCTURE AND ATTACHMENT METHOD FOR WINDOW GLASS AND GLASS MOLDING

Priority is claimed on Japanese Patent Application No. 2006-262042, filed on Sep. 27, 2006, the content of which is incorporated herein by reference.

BACKGROUND OF THE INVENTION

1. Field of the Invention

This invention relates to a structure and a method for attaching a window glass and a glass molding to a vehicle body.

2. Description of the Related Art

In some vehicles, a quarter glass is provided at the rear side face of the vehicle body, and a glass molding is arranged around the peripheral edge of this quarter glass. Technology associated with such vehicles has been proposed in which a glass spacer is fitted to the peripheral edge of a vehicle side glass fitting section, and the quarter glass is secured by adhesive to a glass spacer, after which the glass molding is secured by pressing it into clip portions on the glass spacer (see Japanese Unexamined Patent Application, First Publication No. H08-58383).

However, in such a conventional attachment structure, because the quarter glass and the glass molding engage separately with the glass spacer, some displacement will occur between the quarter glass and the glass molding in the inside-outside direction of the vehicle body.

Furthermore, if the glass molding is made of a metallic sheet material or the like which is prone to deformation, deformation of the glass molding may cause problems when fitting the glass molding to the glass spacer, and thereby deteriorating the easiness of assembling.

The present invention has an object of providing a structure and a method for attaching a window glass and a glass molding, which prevent displacement between the window glass and the glass molding in the inside-outside direction of the vehicle body, and improve the easiness of assembling.

SUMMARY OF THE INVENTION

In order to achieve the above-described object, the present invention employs the following advantageous features. Namely, the present invention employs an attachment structure for a window glass and a glass molding in which the window glass and the glass molding are attached to a glass fitting section of a vehicle body via a molding clip having a glass holding section and a molding attachment section, wherein: the glass holding section is engaged with a peripheral edge of the window glass such that relative movement between the window glass and the glass molding is possible only in a direction along the peripheral edge; the molding attachment section is attached to the glass molding; and the relative movement is restricted along an inside-outside direction of the vehicle body.

According to the attachment structure for a window glass and a glass molding, movement of the window glass in the inside-outside direction of the vehicle body is restricted by the glass holding section of the molding clip, and the relative movement between the window glass and the glass molding in a direction along the peripheral edge of the glass is allowed by sliding of the window glass within the glass holding section. As a result, no displacement occurs between the window glass and the glass molding in the inside-outside direction of the vehicle body. Furthermore, because the glass molding, when attached to the vehicle side glass fitting section, engages with and is held by the peripheral edge of the window glass via the molding clip, deformation of the glass molding will not occur, and thereby improving the assembly process.

It may be arranged such that the molding clip further includes a clip elasticizing device which contacts the peripheral edge of the window glass and presses the molding clip towards a peripheral wall of the glass fitting section; and the glass molding includes a molding elasticizing device which contacts the peripheral wall of the glass fitting section and applies a repulsion force to the glass molding in a direction away from the peripheral wall.

In this case, the glass molding is subjected to elastic force from the edge face of the window glass and the vehicle side glass fitting section, by way of the clip elasticizing device of the molding clip and the molding elasticizing device of the glass molding. Accordingly, because the glass molding is positioned at the location where the elastic forces of the clip elasticizing device and the molding elasticizing device balance each other, the easiness of assembling can be further improved.

It may be arranged such that a plurality of the molding clips are arranged along an extending direction of the glass molding.

In this case, the glass molding is held in a stable and highly rigid manner by the plurality of molding clips. As a result, the easiness of assembling can be further improved.

It may be arranged such that the glass molding is substantially U-shaped, including a pair of substantially straight sections extending along the peripheral edge of the window glass, and a curved section which follows the curve of the window glass and connects the pair of substantially straight sections to each other; and a plurality of the molding clips are arranged along the extending direction of the pair of substantially straight sections.

In this case, the substantially U-shaped glass molding which is easily deformed about the curved section is supported in a highly rigid manner by the plurality of molding clips. As a result, the glass molding, together with the window glass, can be stably attached to the vehicle side glass fitting section.

In addition, the present invention also employs an attachment structure for a window glass and a glass molding for attaching the window glass and the glass molding to a glass fitting section of a vehicle body, the attachment structure including: a molding clip which connects between the window glass and the glass molding such that relative movement between the window glass and the glass molding is allowed only in a direction along a surface of the window glass; and an biasing device which is provided between the glass fitting section and the window glass, and that biases the molding clip towards the window glass.

According to the attachment structure for a window glass and a glass molding as described above, the relative movement between the window glass and the glass molding attachment structure is allowed only in the direction along the surface of the window glass via the molding clip. Furthermore, the glass molding is urged towards the window glass by the urging device. Accordingly, displacement between the window glass and the glass molding in the inside-outside direction of the vehicle body can be prevented, and the easiness of assembling can be further improved.

In addition, the present invention also employs an attachment method for a window glass and a glass molding where the window glass and the glass molding are attached to a glass fitting section of a vehicle body via a molding clip having a glass holding section and a molding attachment section, the attachment method including: attaching the molding attachment section to the glass molding; engaging the glass holding section with a peripheral edge of the window glass such that relative movement between the window glass and the glass molding is allowed only in a direction along the peripheral edge of the window glass; and restricting the relative movement in an inside-outside direction of the vehicle body, while allowing the relative movement along a surface of the window glass.

According to the attachment method for a window glass and a glass molding, in the same manner as when the attachment structure for a window glass and a glass molding described above is used, displacement of the window glass in the inside-outside direction of the vehicle body is restricted by the glass holding section of the molding clip, and the relative position between the window glass and the glass molding in a direction along the glass surface is adjusted by sliding of the window glass within the glass holding section. As a result, no displacement occurs between the window glass and the glass molding in the inside-outside direction of the vehicle body. Furthermore, because the glass molding, when attached to the vehicle side glass fitting section, engages with and is held by the peripheral edge of the window glass via the molding clip, deformation in the glass molding will not occur, and thereby improving the assembly process.

DETAILED DESCRIPTION OF THE INVENTION

An embodiment of the present invention is described below with reference to the drawings. In the following description, unless otherwise specified, "front" and "rear" refer to the front and rear in the traveling direction of the vehicle, and "top" and "bottom" refer to the top and bottom in the vertical direction.

Figure 1:
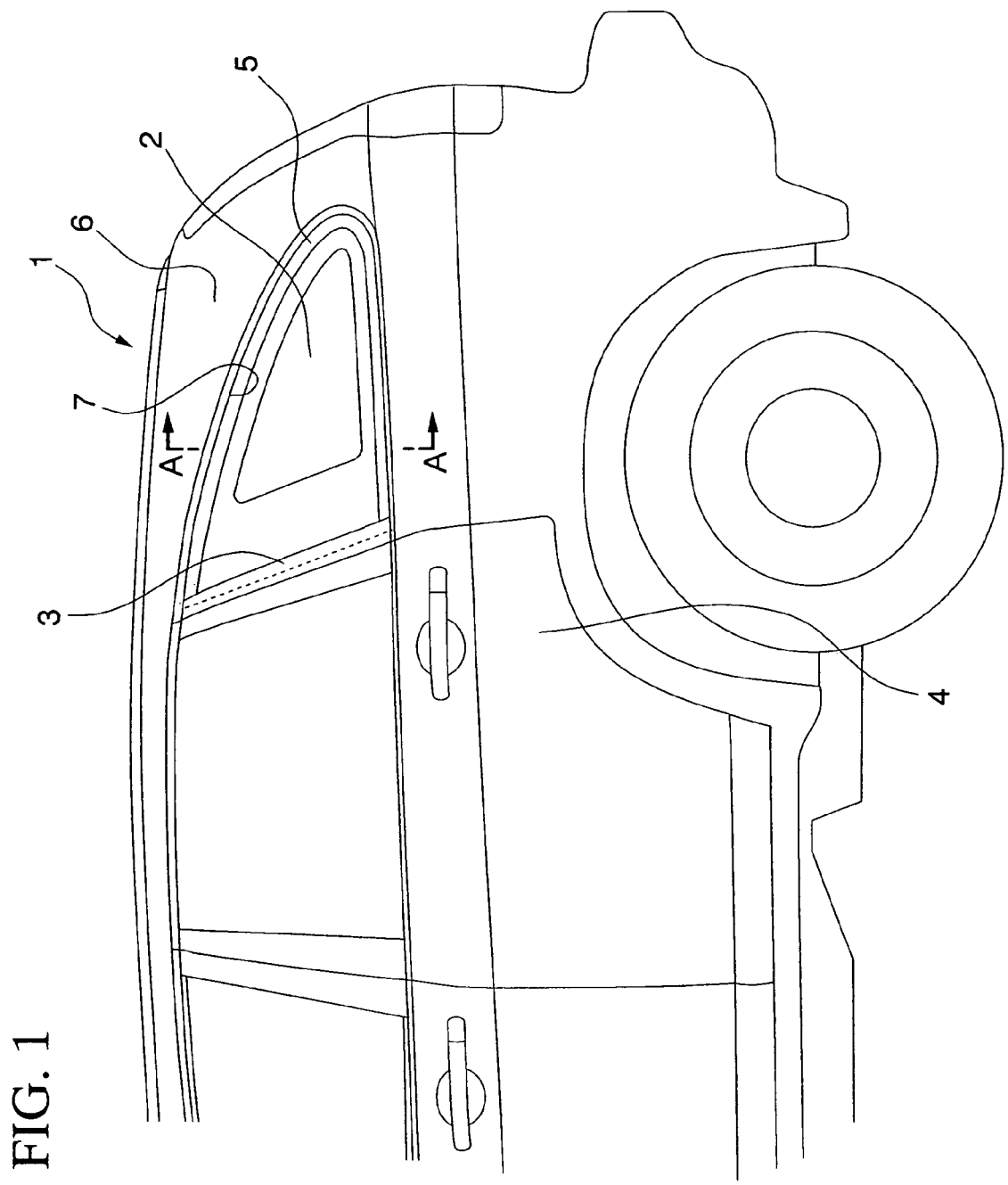
FIG. 1 is a side view of the rear part of a vehicle body according to an embodiment of the present invention.

In FIG. 1, reference numeral 1 denotes a vehicle which uses an attachment structure for a window glass and a glass molding according to the present invention, reference numeral 2 denotes a rear quarter glass serving as the window glass, reference numeral 3 denotes a hollow sealing lip which attaches to the front edge of the rear quarter glass 2 and closely contacts the rear edge of a rear side door 4, and reference numeral 5 denotes a glass molding which, with the exception of the front edge, is attached to the peripheral edge of the rear quarter glass 2.

Figure 2:
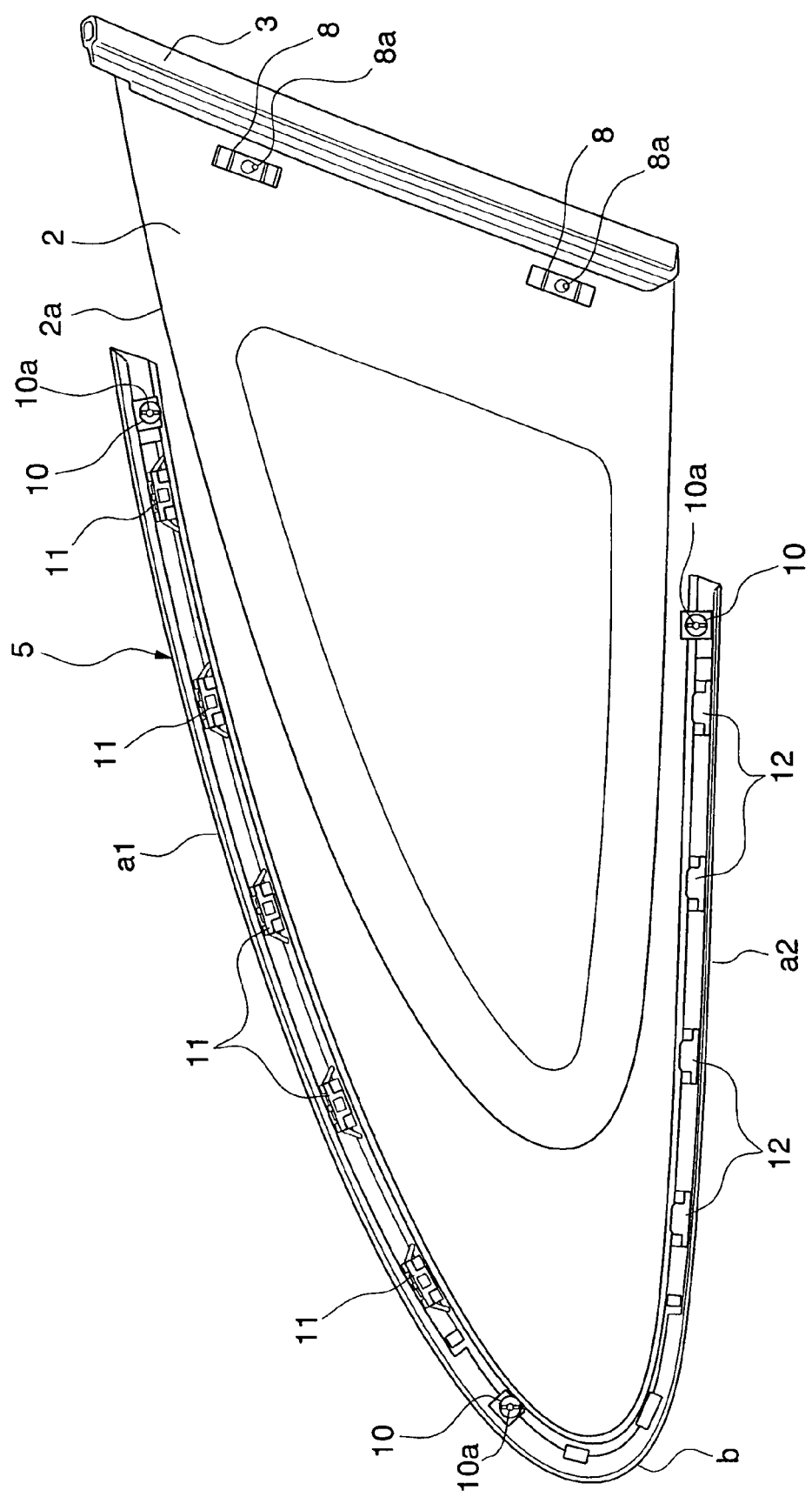
FIG. 2 is an exploded perspective view of a glass assembly according to the embodiment, viewed from the reverse side.
Figure 3:
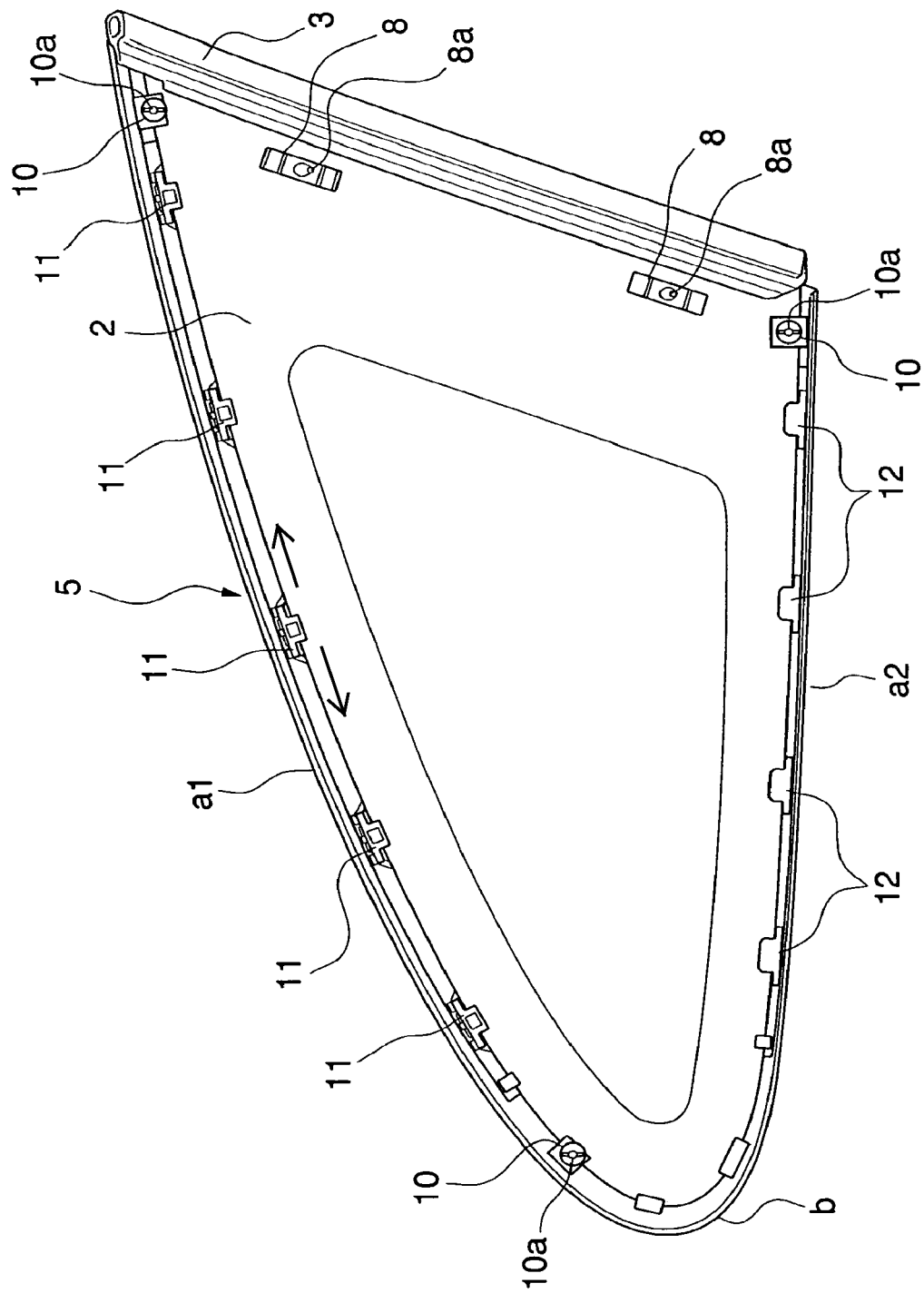
FIG. 3 is a perspective view of a glass assembly according to the embodiment, viewed from the reverse side.
Figure 4A:
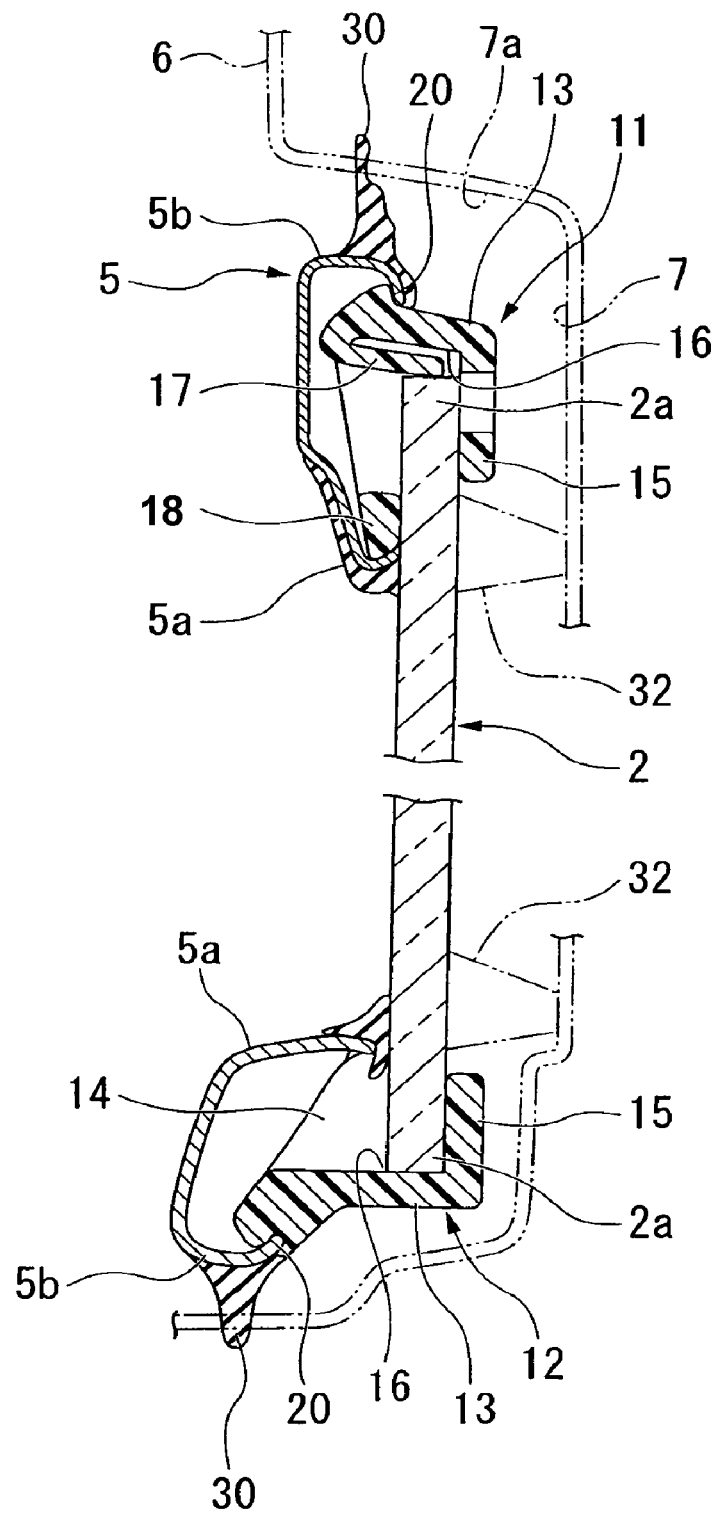
FIG. 4A is a cross-sectional view along the line A-A in FIG. 1.
Figure 4B:
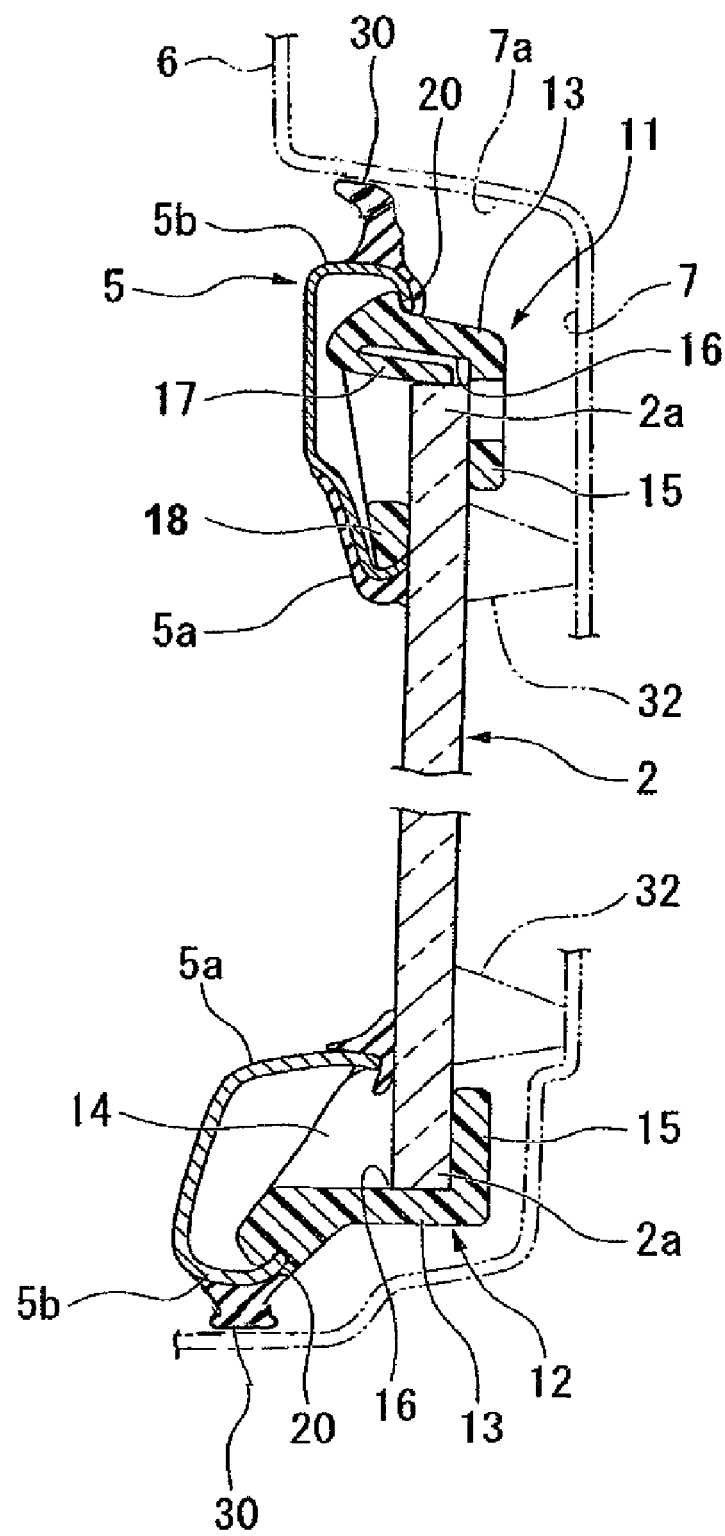
FIG. 4B is a view similar to that of FIG. 4A showing the deformation causing the elastic force of the lip 30.

FIG. 2 and FIG. 3 are, respectively, an exploded perspective view of a glass assembly including the rear quarter glass 2 and the glass molding 5 and the like viewed from the reverse side (the inside of the vehicle body), and a perspective view showing the glass assembly in its assembled state. FIG 4 is a cross-sectional view along the line A-A in FIG. 1.

The rear quarter glass 2 has a substantially triangular shape, of which the angular portion facing the rear of the vehicle body is curved in a circular arc shape, the base is substantially parallel with the traveling direction of the vehicle, and the side adjoining the base is inclined downward from the roof towards the rear of the vehicle body. The rear quarter glass 2 is attached to a rearward vehicle panel 6. A vehicle side glass fitting section 7 which is recessed in a stepped manner, is provided at the position where the rear quarter glass 2 attaches to the vehicle panel 6.

The hollow sealing lip 3 is formed so as to have a substantially constant cross-sectional shape along the longitudinal direction, and as shown in FIG. 2, the base side thereof is adhesively fastened to the front end of the rear quarter glass 2. Furthermore, glass clips 8 are adhesively secured to the front edge of the reverse side of the rear quarter glass 2 at two vertically spaced locations. The glass clips 8 each have a foot section 8a which protrudes towards the inside of the vehicle body, and these foot sections 8a are each inserted into a positioning hole (not shown) on the vehicle side glass fitting section 7.

On the other hand, the glass molding 5 is composed of a plurality of components, most significantly, a thin-walled metallic sheet material exposed primarily to the vehicle exterior. The overall shape of this glass molding 5, as shown in FIG. 2, is substantially a U shape consisting of a pair of substantially straight regions (substantially straight sections) $a_1$ and $a_2$ corresponding to the base and rear oblique side of the rear quarter glass 2, and a curved region (curved section) b which connects the substantially straight regions $a_1$ and $a_2$. At the outside peripheral edge of the glass molding 5, an elastic lip 30 (molding elasticizing device) is provided in an integral manner, the edge of which closely contacts a peripheral wall 7a of the vehicle side glass fitting section 7. Consequently, the peripheral wall 7a applies a repulsion force to the glass molding 5 in a direction away from the peripheral wall 7a.

Anchoring molding clips 10 with foot sections 10a which protrude towards the inside of the vehicle body, are provided near the end of each of the substantially straight regions $a_1$ and $a_2$ at the open end of the U, and on part of the curved region b. The foot sections 10a of these anchoring molding clips 10 are each inserted into a positioning hole (not shown) on the vehicle side glass fitting section 7.

Furthermore, the substantially straight regions $a_1$ and $a_2$ of the glass molding 5 are formed so as to have a box shape in cross-section which is open on the reverse side as shown in FIG. 4. A plurality of molding clips 11 and 12 are attached to the inside of the open part on reverse face of the substantially straight regions $a_1$ and $a_2$.

Figure 5:
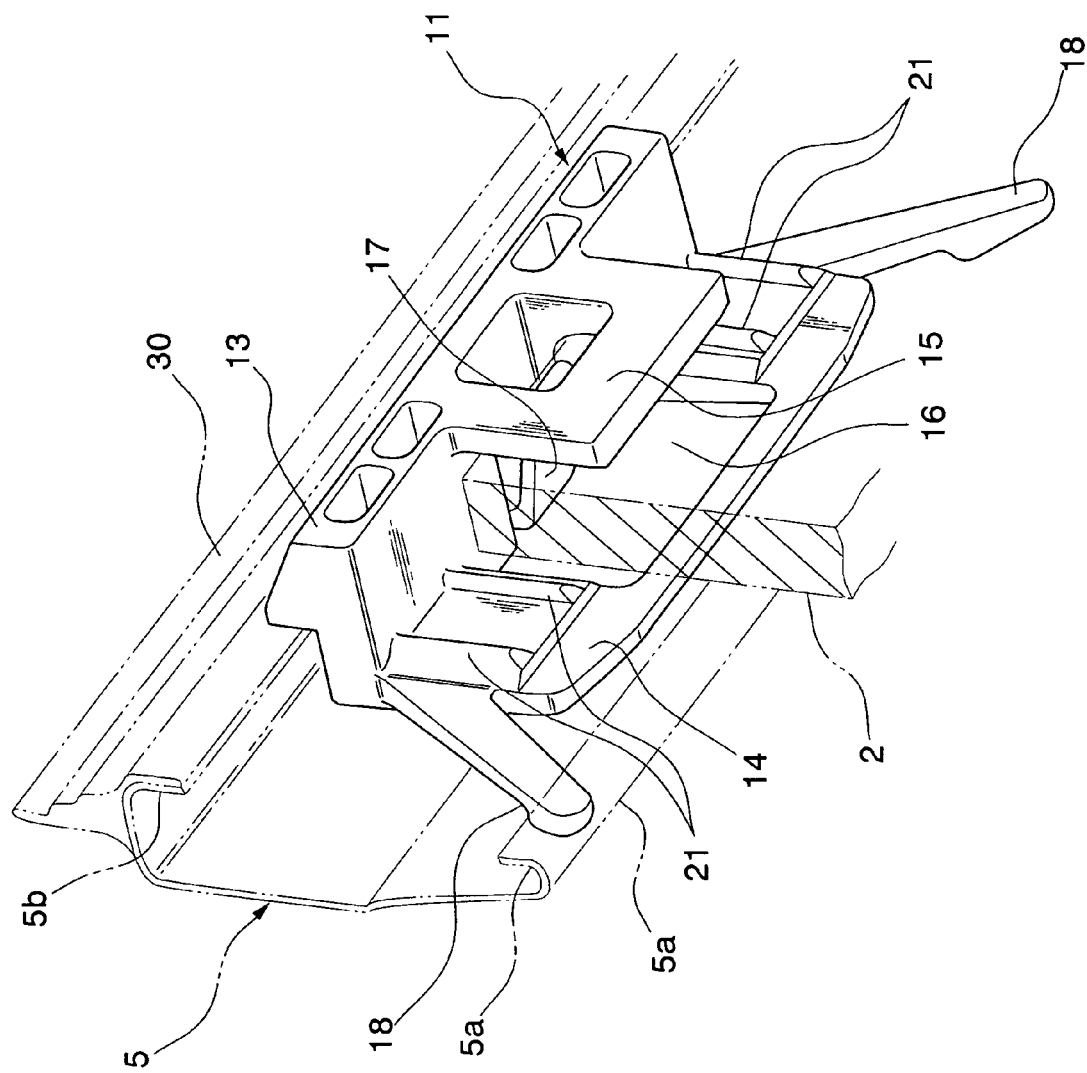
FIG. 5 is a perspective view of a molding clip according to the embodiment.

FIG. 5 is a perspective view showing a molding clip 11 attached to the substantially straight region $a_1$. As shown in this figure and in FIG. 4A, in the molding clip 11, a pair of sandwiching pieces 14 and 15 is provided in a protruding manner on a substantially rectangular clip base 13, which together form a groove shaped glass holding section 16. This glass holding section 16 sandwiches the edge 2a of the rear quarter glass 2 such that clip 11 can slide in a direction along the glass edge. Furthermore, on the clip base 13, a flat biasing projection 17 (clip elasticizing device) which extends obliquely towards the open side of the glass holding section 16, is provided so as to contact the edge face of the rear quarter glass 2 engaged within the glass holding section 16. Accordingly, the elasticity of the biasing projection 17 forces the molding clip 11 towards the peripheral wall 7a of the vehicle side glass fitting section 7.

Furthermore, as shown in FIG. 5, on the one sandwiching piece 14, a pair of locking projections 18 is provided whose ends extend away from the sandwiching piece 14 and engage with the inner peripheral wall 5a of the glass molding 5. In addition, on the back of the clip base 13 (the surface opposite to that where the glass holding section 16 is formed), a stepped locking section 20 is formed as shown in FIG. 4, which locks the edge of the outer peripheral wall 5b of the glass molding 5. The glass molding 5 is attached to the molding clip 11 so as to cover part of the clip base 13 and the one sandwiching piece 14, and is held in place by the locking projections 18 and the locking section 20. In this embodiment, the locking projections 18 and the locking section 20 constitute the molding attachment section. Furthermore, as shown in FIG. 5, ribs 21 are formed on the surface of the one sandwiching piece 14 which contacts the side face of the rear quarter glass 2. These ribs 21 are formed along the direction of the opening of the glass holding section 16.

Figure 6:
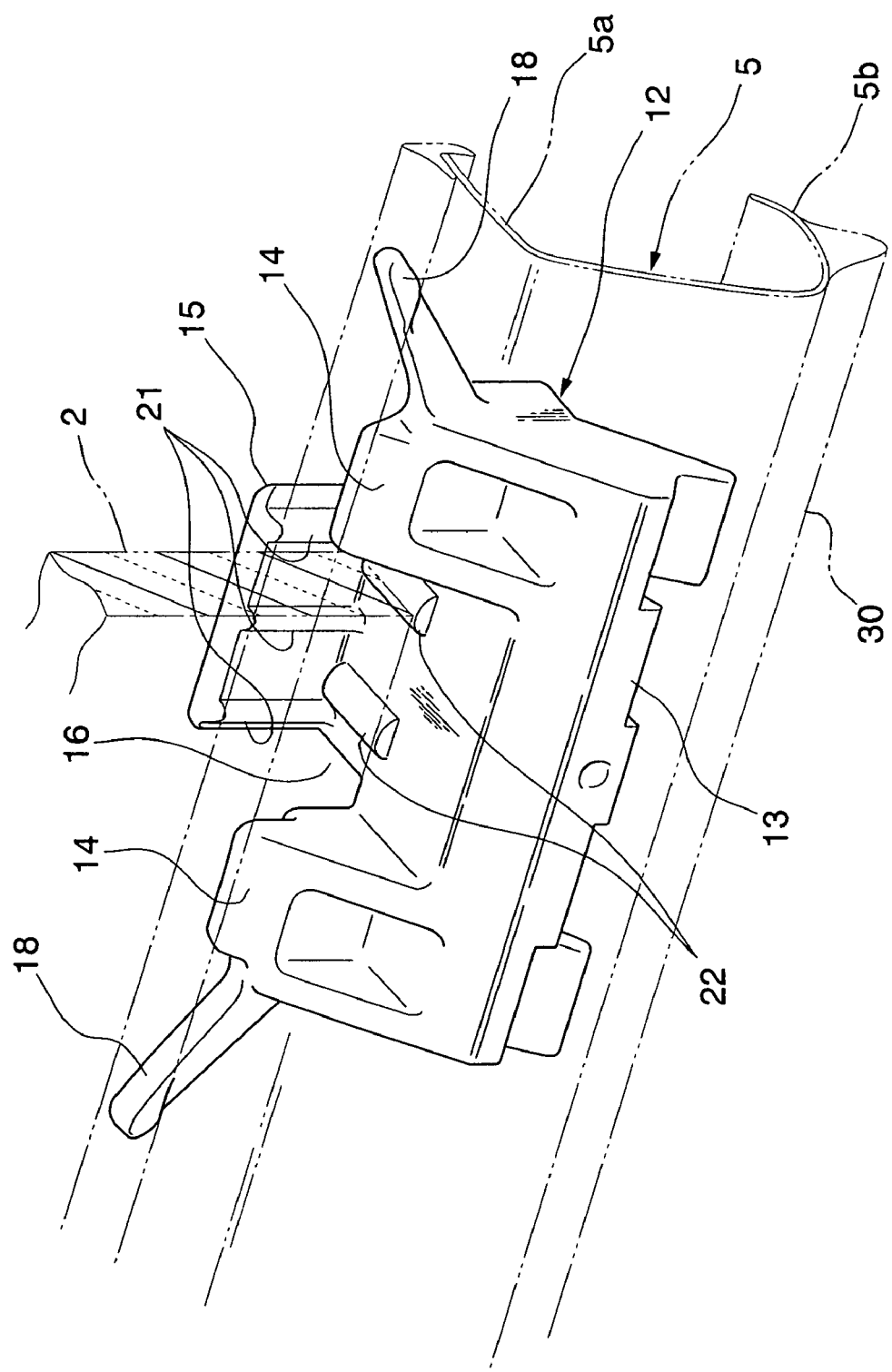
FIG. 6 is a perspective view of another molding clip according to the embodiment.

FIG. 6 is a perspective view showing the molding clip 12 attached to the other straight region $a_2$. As shown in this figure and in FIG. 4, the molding clip 12 has substantially the same construction as the molding clip 11 described above, with the exception that ribs 22 are provided instead of the biasing projection 17 on the clip base 13 at positions facing the edge face of the rear quarter glass 2. Other parts of the molding clip 12 that serve the same function as those in the molding clip 11 are denoted by the same reference numerals, and overlapping description is omitted.

When attaching the rear quarter glass 2 and the molding clip 12 to the vehicle side glass fitting section 7, first the glass molding 5 is assembled, and then the anchoring molding clips 10 and the molding clips 11 and 12 are attached at predetermined locations of the glass molding 5 (see FIG. 2).

On the other hand, the hollow sealing lip 3 and the glass clips 8 are attached to the rear quarter glass 2 in advance.

Next, the groove shaped glass holding section 16 of each molding clip 11 and 12 attached as described above to the glass molding 5, engages with the edge 2a of the rear quarter glass 2 on the base and rear oblique side, in a freely sliding manner (see FIG. 2 and FIG. 3). The glass assembly including the glass molding 5 having undergone preliminary assembly is inserted into the depression in the vehicle side glass fitting section 7, where the glass clips 8 at the front end of the rear quarter glass 2 and the anchoring molding clips 10 at three locations on the glass molding 5 engage with the each corresponding positioning hole in the vehicle side glass fitting section 7 respectively.

When the glass assembly is inserted into the depression in the vehicle side glass fitting section 7 as described above, the elastic lip 30 on the outer periphery of the glass molding 5 makes pressure contact with the peripheral wall 7a. As a result, the pair of substantially straight regions $a_1$ and $a_2$ of the glass molding 5 are pushed towards the rear quarter glass 2 by the elasticity of the elastic lip 30. On the other hand, the molding clips 11 and 12 attached to the substantially straight regions $a_1$ and $a_2$ of the glass molding 5 are pushed towards the peripheral wall 7a of the vehicle side glass fitting section 7 by the edge face of the rear quarter glass 2, via the glass holding section 16. Accordingly, the glass molding 5 is maintained at the proper position between the rear quarter glass 2 and the peripheral wall 7a of the vehicle side glass fitting section 7. In particular, the molding clip 11 attached to the upper substantially straight region $a_1$ is pushed towards the peripheral wall 7a of the vehicle side glass fitting section 7 by the elasticity of the biasing projection 17 which contacts the edge face of the rear quarter glass 2. As a result, the substantially straight region $a_1$ of the glass molding 5 is automatically positioned where the elastic forces of the elastic lip 30 and the biasing projection 17 balance each other.

Moreover, because an adhesive 32 is applied in advance between the rear quarter glass 2 and the vehicle side glass fitting section 7 as shown in FIG. 4, the rear quarter glass 2 and the glass molding 5, once properly positioned, are secured to the vehicle side glass fitting section 7 by the adhesive 32 which is spread around.

As described above, with the attachment structure and method of the present invention, because the molding clips 11 and 12 are attached to the glass molding 5 so as to sandwich the edges of the rear quarter glass 2 in the glass holding section 16, displacement between the glass molding 5 and the rear quarter glass 2 in the inside-outside direction of the vehicle body can be reliably prevented.

Furthermore, the glass molding 5 is attached to the vehicle side glass fitting section 7 not separately, but in the form of a glass assembly incorporating the rear quarter glass 2. Consequently, despite the glass molding 5 having a thin-walled substantially U-shaped construction whose overall shape is prone to deformation, the glass molding 5 can be easily attached to the vehicle side glass fitting section 7 together with the rear quarter glass 2.

Furthermore, the attachment structure and method of the present invention provides an advantage in that the glass and the glass molding can be fitted to the vehicle body with great efficiency because the position of the glass molding 5 is automatically adjusted to an appropriate position where the elastic forces of the biasing projection 17 of the molding clip 11 and the elastic lip 30 of the glass molding 5 balance each other.

In addition, in this embodiment, because the molding clips 11 and 12 are provided at a plurality of locations along the longitudinal direction of the glass molding 5, the glass molding 5 is supported in a stable and highly rigid manner by the rear quarter glass 2. Accordingly, the glass molding 5 can be easily assembled into the vehicle side glass fitting section 7 together with the rear quarter glass 2.

In particular, in this embodiment, because a plurality of molding clips 11 and 12 are provided along the extending direction of the substantially straight regions $a_1$ and $a_2$ of the easily deformable substantially U-shaped glass molding 5, the easiness of assembling can be further improved.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An attachment structure for a window glass and a glass molding in which the window glass and the glass molding are attached to a glass fitting section of a vehicle body via a molding clip having a glass holding section and locking projections and a locking section, wherein:

the glass holding section is engaged with a peripheral edge of the window glass such that relative movement between the window glass and the glass molding is possible only in a direction along the glass molding;

the locking projections and the locking section are attached to the glass molding; and the relative movement is restricted along an inside-outside direction of the vehicle body;

the molding clip further comprises a biasing projection which contacts the peripheral edge of the window glass and presses the molding clip towards a peripheral wall of the glass fitting section; and the glass molding comprises an elastic lip which contacts the peripheral wall of the glass fitting section and applies a repulsion force to the glass molding in a direction away from the peripheral wall;

wherein the glass molding is positioned where elastic forces of the biasing projection and the elastic lip on the glass molding substantially balance each other.

2. The attachment structure for a window glass and a glass molding according to claim 1, wherein a plurality of the molding clips are arranged along an extending direction of the glass molding.

3. The attachment structure for a window glass and a glass molding according to claim 2, wherein:

the glass molding is substantially U-shaped, comprising a pair of glass support sections extending along the peripheral edge of the window glass, and a curved section which follows the curve of the window glass and connects the pair of glass support sections to each other; and a plurality of the molding clips are arranged along the the pair of glass support straight sections.

4. The attachment structure for a window glass and a glass molding according to claim 3, wherein the molding clips arranged along an extending direction of one of the glass support sections are each provided with said biasing projection; and the molding clips arranged along an extending direction of another of the glass support sections are each provided with a rib.

5. The attachment structure for a window glass and a glass molding according to claim 4, wherein the glass molding comprises a thin-walled metallic sheet material of a substantially U-shape, the molding having at the outside peripheral edge an elastic lip which contacts the vehicle body.

6. The attachment structure for a window glass and a glass molding according to claim 5, wherein an adhesive is applied between the glass and the vehicle body.

* * * * *